United States Patent [19]

Domek et al.

[11] Patent Number: 5,046,913

[45] Date of Patent: Sep. 10, 1991

[54] QUICK INSTALL AND REMOVE SLIDABLE CARRYING TABLE FOR VEHICLES

[76] Inventors: Robert F. Domek, R.R. 2; Douglas J. Metz, 1608 Pleasant St., both of Emmetsburg, Iowa 50536

[21] Appl. No.: 476,899

[22] Filed: Feb. 8, 1990

[51] Int. Cl.$^5$ .............................................. B60P 3/00
[52] U.S. Cl. ..................................... 414/522; 24/514; 248/503; 280/43.24
[58] Field of Search ....................... 414/522, 537, 786; 296/21, 26, 37.6; 403/166, 146; 280/43.24, 43; 410/77, 80, 85, 90, 91, 101, 106, 107; 248/503, 499; 24/514, 535, 569

[56] References Cited

U.S. PATENT DOCUMENTS

| | | | |
|---|---|---|---|
| 1,636,562 | 7/1927 | Hick | 248/503 X |
| 2,625,989 | 1/1953 | Pond et al. | 280/43.24 X |
| 2,784,027 | 3/1957 | Temp | 296/23 |
| 2,852,303 | 9/1958 | Hopson | 296/26 |
| 3,726,422 | 4/1973 | Zelin | 414/522 |
| 3,768,673 | 10/1973 | Nydam et al. | 414/522 |
| 4,303,367 | 12/1981 | Bott | 414/522 |
| 4,616,373 | 10/1986 | Perez | 414/522 X |
| 4,681,360 | 7/1987 | Peters et al. | 414/522 X |
| 4,685,857 | 8/1987 | Goeser et al. | 414/522 |
| 4,900,217 | 2/1990 | Nelson | 296/26 X |
| 4,909,558 | 3/1990 | Roshinsky | 296/37.6 |
| 4,948,311 | 8/1990 | St Pierre et al. | 248/503 X |

FOREIGN PATENT DOCUMENTS 3248056  6/1984  Fed. Rep. of Germany ...... 248/503

Primary Examiner—David A. Bucci
Attorney, Agent, or Firm—Zarley, McKee, Thomte, Voorhees & Sease

[57] ABSTRACT

An easy to install and remove slidable carrying table for vehicles includes a base frame which is quickly and conveniently attachable and detachable to a vehicle floor, and which provides the base upon which a carrying table can be slidably mounted. The base can be installed by one person to the vehicle floor and the same person can introduce the table to the base. Diassembly is also quick and easy to allow the vehicle to be transformed to a different use. The slidable table allows objects to be loaded on the table outside of the vehicle and then the table can be slid into the vehicle for transport. Optional features include locking mechanisms to hold the table in various desired positions and to prevent undesired movement.

5 Claims, 5 Drawing Sheets

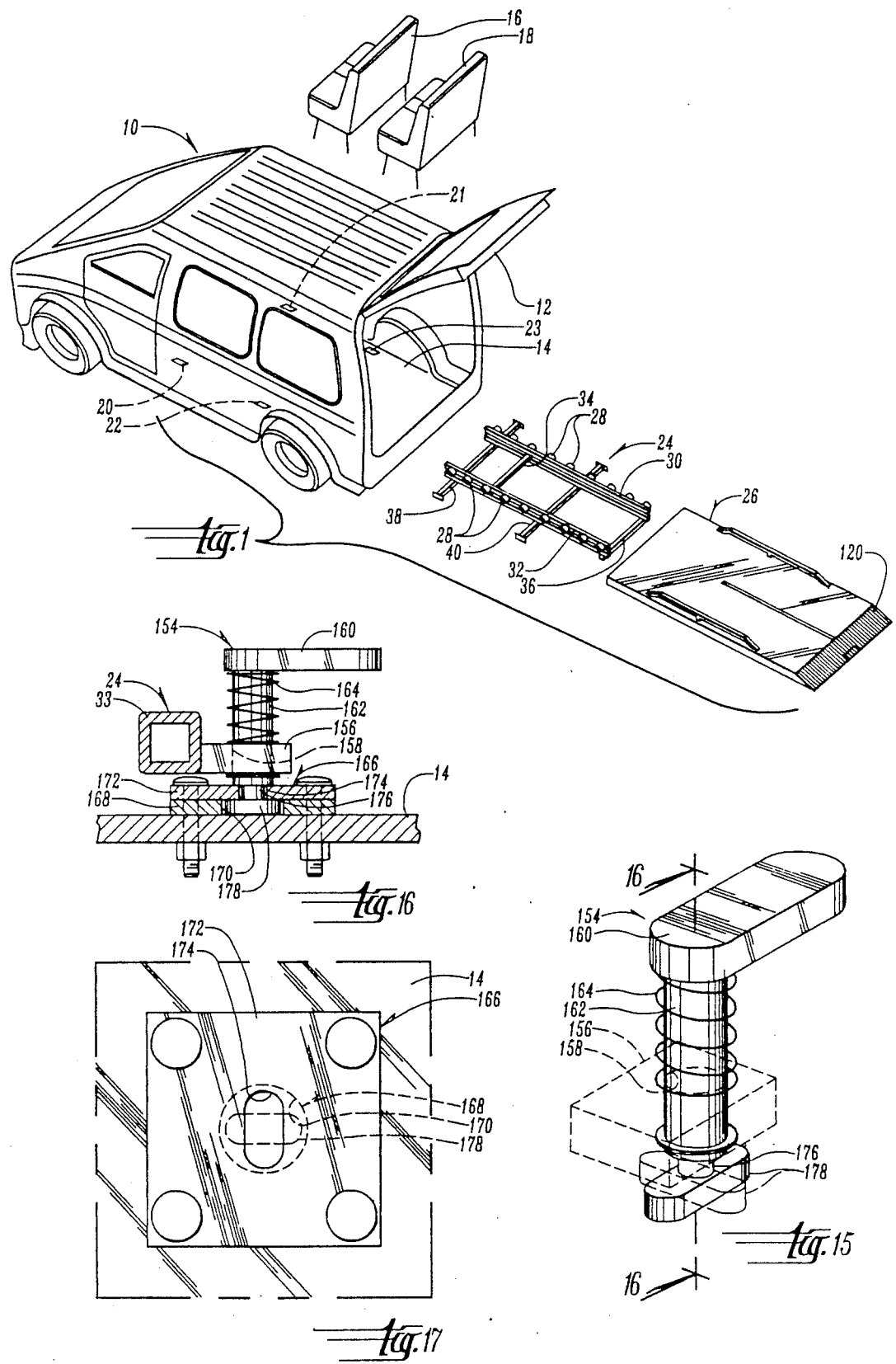

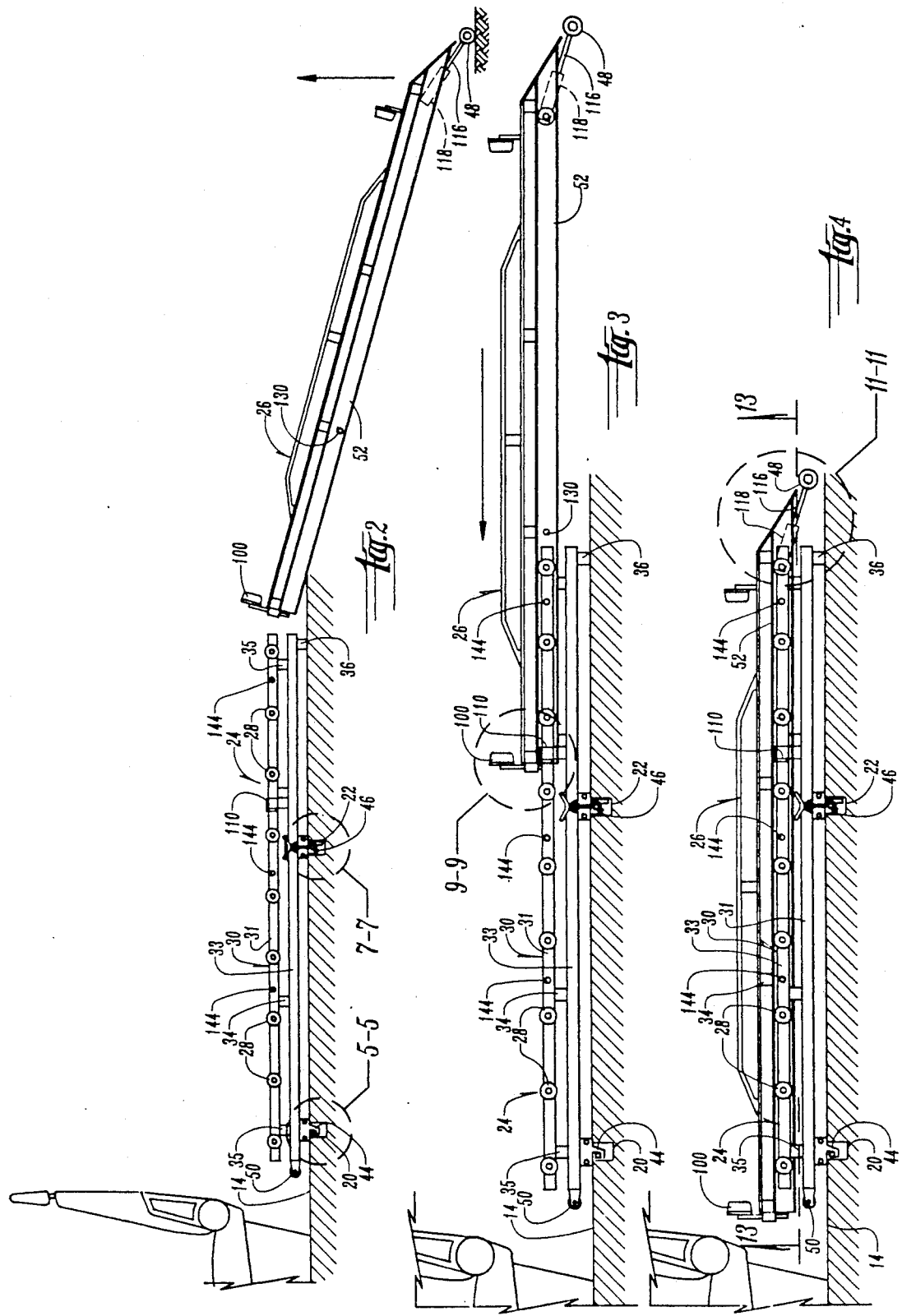

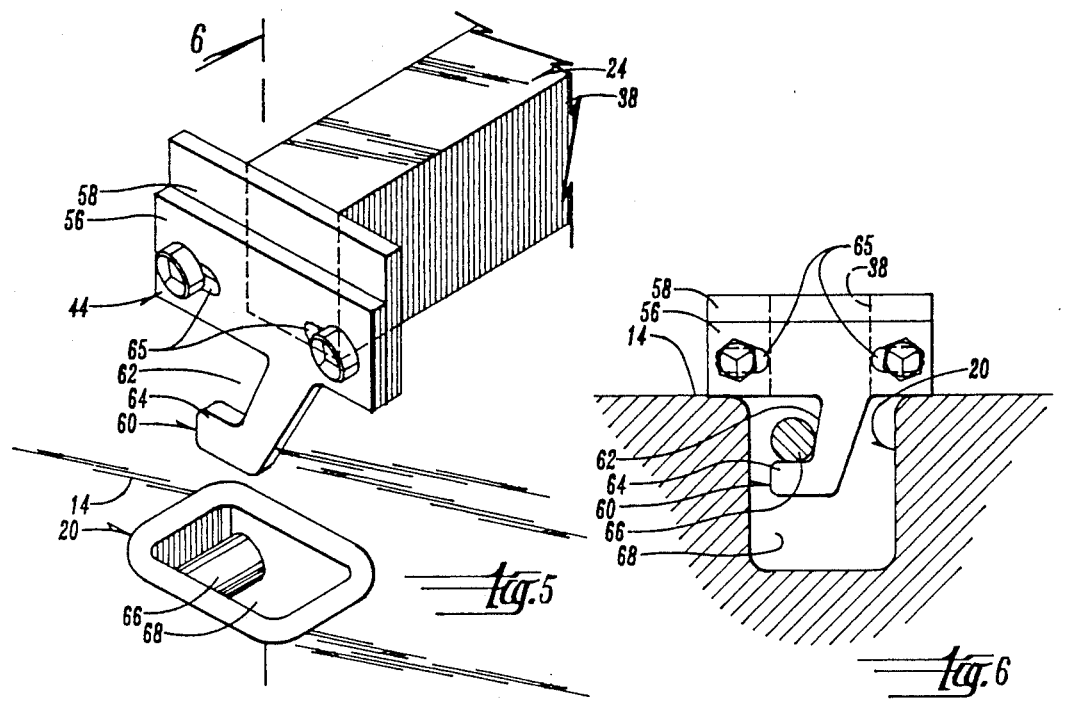
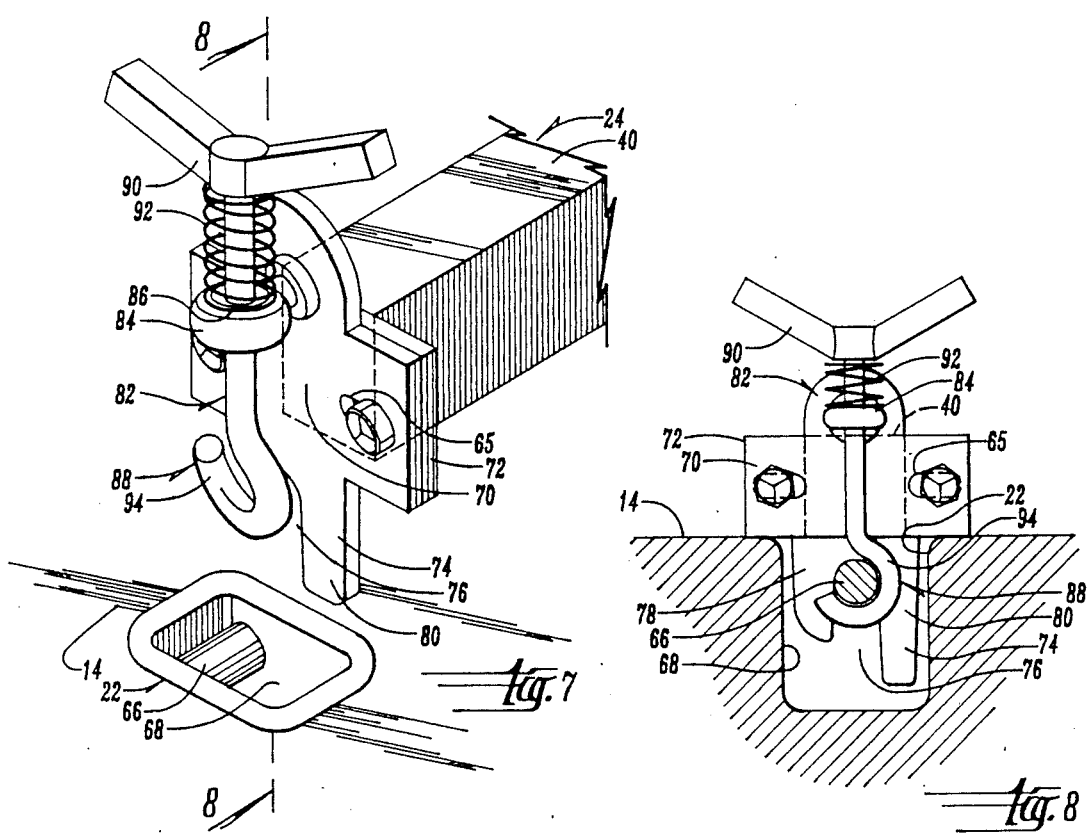

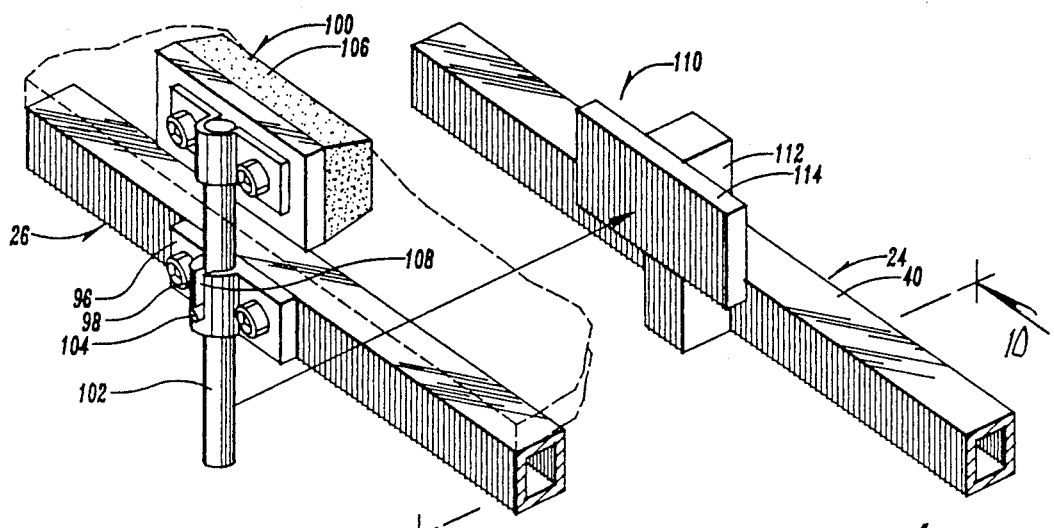
_fig. 9_
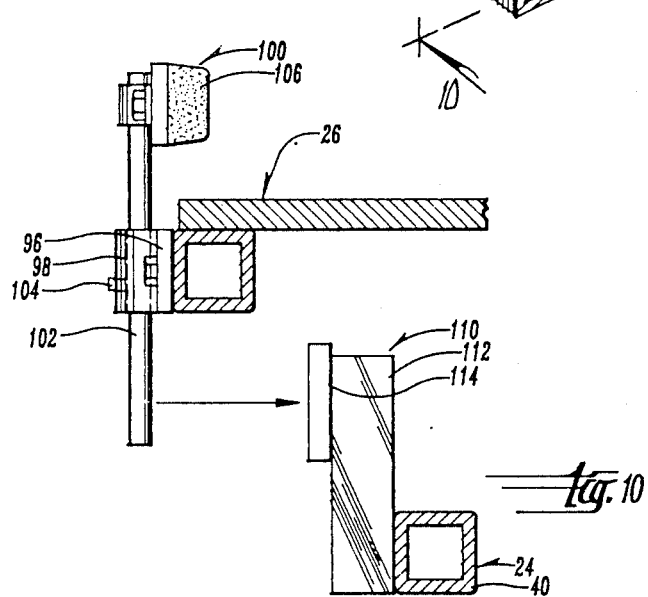
_fig. 10_
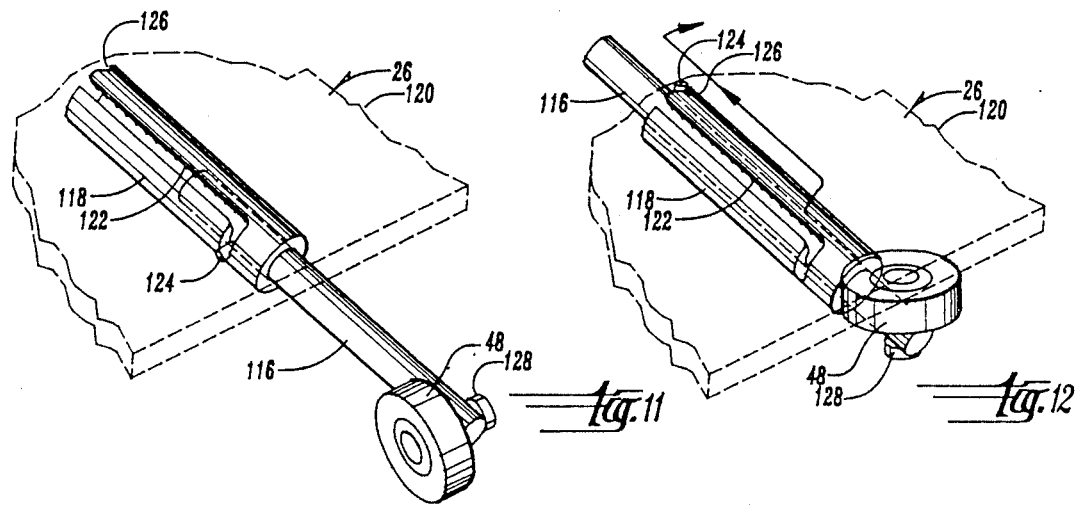
_fig. 11_   _fig. 12_

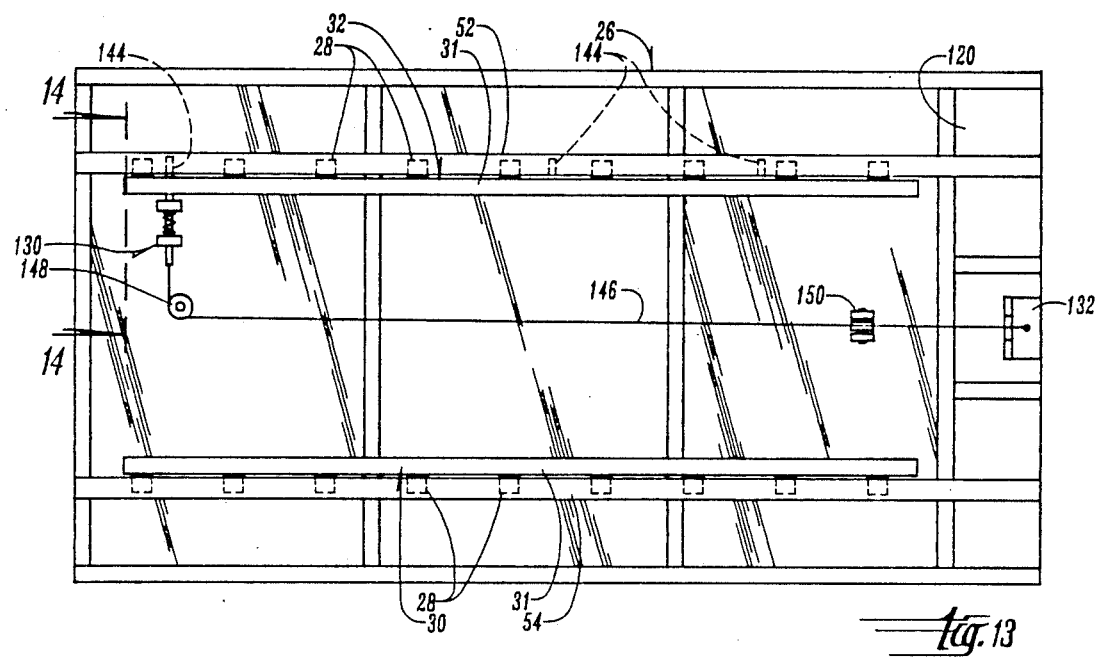
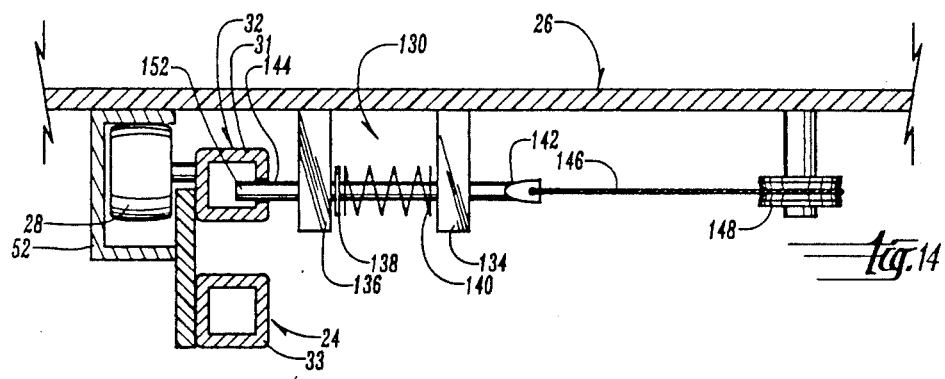

QUICK INSTALL AND REMOVE SLIDABLE CARRYING TABLE FOR VEHICLES

BACKGROUND OF THE INVENTION

1. Field of the Invention

The present invention relates to load carrying devices, and particularly to slidable load carrying platforms or tables for vehicles.

2. Problems in the Art

Many different types of businesses or operations require transporting of items from place to place. Many times a station wagon, truck, or van is utilized for this purpose, as is well known.

Use of conventional pickups, vans, or trucks requires the load which is being transported to be lifted and moved to a cargo bed of the vehicle. For large or heavy objects, this is often not an easy task.

Various attempts have been made to facilitate easier loading by incorporating ramps, slidable tables, or other loading-assist mechanisms. While many times improving the ease by which items can be loaded to the vehicle, problems still exist with most of these types of systems.

Simple ramps assist in sliding items up into a cargo bed, but must be separately stored or carried once the cargo is inside.

Other types of tailgate lifts or slidable load carrying platforms require significant hardware be installed into the vehicle bed or on or associated with the tailgate or bumper. This not only is expensive, but basically permanently alters the nature of the vehicle. In other words, for a slidable platform to be installed, a base must be securely bolted or otherwise fixed to the vehicle floor bed. The platform would then be slidably mounted on the base. The vehicle therefore would have to continuously carry the fixed base and could not be easily converted for other uses.

Some of the attempts also are mechanized to assist in loading, but this requires a power source and involves expensive and cumbersome machinery.

Still further, alteration of vehicles to accommodate most conventional load assist systems entails time consuming and expensive installation as well as limits the flexibililty of use of the vehicle once installed.

It can therefore be seen that problems and deficiencies still exist in the art. There is a real need for an improved way to assist in loading and carrying items, especially large or heavy items in vehicles, and especially to retain flexibility and easy convertibility of use for the vehicle, as well as easy installation and removal of the system.

It is therefore a primary object of the present invention to provide a slidable carrying table for vehicles which improves upon or solves the problems and deficiencies in the art.

Another object of the present invention is to provide a table as above described which can be easily attached and detached from a vehicle to allow easy conversion of the vehicle between uses.

Another object of the present invention is to provide a table as above described which can be easily installed, removed, and moved around even by one person.

A still further object of the present invention is to provide a table as above described which is adaptable to a wide variety of vehicles, and can be installed to many vehicles using the structure of the vehicles themselves.

A further object of the present invention is to provide a table as above described which is useful for a wide variety of uses.

A still further object of the present invention is to provide a table as above described which facilitates easy loading, unloading, storage, and transport of items.

Another object of the present invention is to provide a table as above described which minimizes wear and tear on the vehicle.

A still further object of the present invention is to provide a table as above described which is sturdy, durable, economical and safe.

These and other objects, features, and advantages of the present invention will become more apparent with reference to the accompanying specification and claims.

SUMMARY OF THE INVENTION

The invention utilizes an easily installable base frame which is unitary in design. The base can then be transported by one person to the load carrying vehicle, raised to the load carrying bed and installed. A significant feature of the invention is the ease by which the base frame can be secured in the vehicle bed without permanent installation. This allows the frame to be easily removed, the vehicle to be converted to a different use, and therefore providing the advantage of a quick install load assist table when required.

The base frame includes means to secure it to the vehicle bed or floor. The actual load carrying table is also movable by one person to the load carrying vehicle and is slidably installable onto the base frame. A connection means is utilized between the base frame and the table to facilitate this slidable relationship. Generally, this includes roller bearings which are mateably inserted into channels or rails to facilitate easy installation of the table to the base frame and the slidable movement.

The invention can be installed in a wide variety of vehicles and can be used for a wide variety of purposes. Optional features include the ability to lock the table in preselected positions with respect to the base frame, the incorporation of safety stops to prevent the table from sliding off the base frame or sliding farther than desired, and ways to more easily move the components around. Also, the manner by which the base frame is secured to the vehicle floor can be designed for easy and flexible use with different vehicles.

Other options and features of the invention are possible.

BRIEF DESCRIPTION OF THE DRAWINGS

FIG. 1 is a perspective view of a load carrying vehicle showing removable seats and an embodiment of the invention before installation.

FIG. 2 is a partial side elevational view of the embodiment of the invention shown in FIG. 1 having the base frame installed in the vehicle and its table portion in position to be slidably attached to the base frame.

FIG. 3 is a view similar to FIG. 2 showing the table attached to the base frame but in an extended horizontal position.

FIG. 4 is a view similar to FIGS. 2 and 3 but shows the table attached to the base frame and in a completely inserted position.

FIG. 5 is an enlarged sectional view taken along line 5—5 of FIG. 2 and showing a hold down means in the floor of the vehicle.

FIG. 6 is a sectional view taken along line 6—6 of FIG. 5 but showing the combination in assembled form.

FIG. 7 is a sectional view taken along line 7—7 of FIG. 2 and including a conventional hold down member in a vehicle floor or bed.

FIG. 8 is a sectional view taken along line 8—8 of FIG. 7 but showing the combination in assembled form.

FIG. 9 is a sectional view taken along line 9—9 of FIG. 3 but showing the elements in a spaced apart rather than abutting relationship form.

FIG. 10 is a sectional view taken along line 10—10 of FIG. 9.

FIG. 11 is a sectional view taken along line 11—11 of FIG. 4 but showing the assist wheel in an extended position.

FIG. 12 is a view similar to FIG. 11 but showing the assist wheel in a retracted position such as is shown in FIG. 4.

FIG. 13 is a partial bottom view taken along line 13—13 of FIG. 4.

FIG. 14 is a view taken along line 14—14 of FIG. 13.

FIG. 15 is a perspective view of an alternative embodiment of a hold down mounting means for the base frame to the vehicle floor.

FIG. 16 is a sectional view taken along lines 16—16 of FIG. 15.

FIG. 17 is a top plan view of a mounting plate for the lock-down structure of FIGS. 15 and 16.

DETAILED DESCRIPTION OF THE PREFERRED EMBODIMENT

To assist in an understanding of the invention, a detailed description of a preferred embodiment will now be described. It is to be understood that this is only a discussion of one form the invention can take and is not intended to, nor does it, specifically limit the invention.

The drawings will be referred to in this description. Reference numerals will be utilized to identify parts and locations in the drawings. The same reference numerals will be used for the same parts and locations throughout the drawings unless otherwise indicated.

With particular reference to FIG. 1, a van or vehicle 10 is shown with its rear hatch 12 open to reveal the floor 14. Van 10 includes quick release bench seats 16 and 18 which can easily be installed or removed according to desire.

When it is desired to use van 10 as a passenger vehicle, seats 16 and 18 can be installed into hold down members which can exist in floor 14 of van 10, as is well known in the art. When it is desired to have more space in van 10, seats 16 and/or 18 can be released from the hold down members 20-23 and removed through the rear or the side door to the van.

According to a preferred embodiment of the present invention, if van 10 is desired to be utilized as a cargo carrying van, and particularly for large or heavy loads, a base frame 24 can be easily installed into hold down members 20-23 on floor 14 inside van 10. A slidable carrying table 26 can then be easily inserted onto roller bearings 28 on base frame 24. Van 10 will therefore have a table upon which loads can be transported. Table 26 can be easily slid on bearings 28 to assist in loading and unloading on or from table 26.

It is to be understood that the present invention facilitates the quick, easy, and one-person conversion of van 10 to the load carrying mode with the slidable carrying table 26. When it is no longer desired to utilize table 26, it can easily be removed from base frame 24, and base frame 24 can be quickly and easily removed from van 10. FIGS. 2, 3, and 4 show in more detail the installation of base frame 24 to van floor 14, and assembly of table 26 to base frame 24.

By referring also to FIG. 1, it can be seen that base frame 24 includes longitudinal beams 30 and 32 upon which roller bearings 28 are mounted on axles. Roller bearings 28 basically comprise wheels independently rotatable with an upper surface extending above the uppermost longitudinal beams 30 and 32. The roller bearings 28 also extend on the outward sides of beams 30 and 32.

The unitary nature of base frame 24 can also be seen in that cross beams 34 and 36, along with transverse beams 38 and 40, hold longitudinal beams 30 and 32 in place. Thus, frame 24 can be handled as one piece for easy installation and removal.

FIG. 2 shows how longitudinal beams 30 and 32 actually are comprised of upper and lower sections 31 and 33 held apart by spacers 35. It can also be seen how at the opposite ends of each transverse beam 38 and 40 exists a hold down bracket (the front hold down brackets being identified by reference numeral 44, the back hold down brackets by reference numeral 46). Brackets 44 and 46 are insertable into hold down members 20-23 in floor 14 of van 10 to secure frame 24 in place.

FIG. 2 also shows how table 26 can be brought up to the back end of installed frame 24. It is noted that wheels 48 are associated with the back end of table 26 to allow it to be rolled into place. Likewise, wheels 50 at the front of frame 24 allow it to be easily rolled up to van 10 before being lifted and installed.

FIG. 2, showing table 26 leaned up to frame 24 at the back of van 10, depicts both how easy it is to install table 26 on frame 24 as well as remove the same. By referring to FIG. 3, it can be seen that table 26 merely needs to be aligned with roller bearings 28 and slid into place on frame 24. Two parallel c-channel rails 52 and 54 (see FIG. 13 also) are secured longitudinally along the bottom of table 26. Rails 52 and 54 are configured so that the roller bearings enter the c-channels. As can be seen in FIGS. 3 and 4, the open sides of c-channel rails 52 and 54 face inwardly towards one another. Table 26 is then slidable longitudinally along frame 24, but cannot be moved vertically or laterally to that longitudinal axis.

FIG. 4 shows the table 26 in its fully inserted position on frame 24. In that position, hatch 12 can be closed and van 10 is ready to transport the load to its destination.

It is to be understood that in the preferred embodiment, frame 24 is attached to van floor 14 utilizing the already-in-place hold down members 20-23 in floor 14. Additionally, table 26 can be selectively locked into a variety of positions along frame 24. Still further, a safety stop can be incorporated to prevent table 26 from sliding off of base frame 24. These and other more specific features of the invention will now be discussed.

FIG. 5 shows in enlarged detail the preferred embodiment for front hold down members 44. As can be seen, an upper portion 56 is bolted to flange 58 at the end of transverse beam 38 of base frame 24. A lower portion 60 consists of a c-shaped leg 62 which defines a horizontal notch 64. Notch 64 is open in the direction of the front of van 10.

FIG. 5 also shows an example of a hold down member 20, 21, 22, or 23. A bar 66 is secured within a cavity 68 in floor 14.

As can easily be understood, to install front hold down members 44 into hold down members 20 and 21 in floor 14, the rear end of frame 24 is raised so that c-shaped portion 62 is manually guided down and around bar 66 into position such as is shown in FIG. 6. This prevents any further forward movement of frame 24 or vertical upward movement at the front of frame 24. It is noted that apertures 65 in the upper portion of bracket 44, are elongated to provide for some adjustment with respect to hold down members 20 and 21 for vehicle 10, or so that base frame 24 can be installed in other vehicles, or can be pre-designed to adjust to differences between vehicles.

FIGS. 7 and 8 show rear or back hold down members 46 and their relationship with hold down members 22 and 23, and floor 14. An upper portion 70 is similarly bolted to a flange 72 at the opposite ends of transverse beam 40 for frame 24. A lower portion 74, instead of being c-shaped, is in somewhat the shape of an inverted "u" having a vertical notch 76 defined by legs 78 and 80. It is noted that leg 78 has a rounded forward surface and that leg 80 has a longer length than leg 78.

As can be seen in FIG. 8, frame 24, after front hold down members 44 are in place can simply be dropped vertically downward so that bar 66 in each hold down member 22 and 23 seats in notch 76. This will prevent any longitudinal movement of frame 24. The configuration of the legs 78 and 80 also contributes to a secure fit within hold down members 20-23.

As can also be seen in FIGS. 7 and 8, a locking mechanism is incorporated to lock frame 24 into place. Locking mechanism 82 in the preferred embodiment consists of an eye bolt 84 secured horizontally through aperture 86 in back hold down brackets 46. A j bolt 88 is positioned vertically through the eye of eye bolt 84 and is retained in that position by wing nut 90. The j-shaped portion of j bolt 88 is below eye bolt 84. A spring 92 is positioned around j bolt 88 between wing nut 90 and eye bolt 84 to bias j bolt 88 upwardly.

As can be seen in FIG. 8, because eye bolt 84 is rotatable, j bolt 88 can be both tilted and pushed downwardly so that the j-shaped end 90 of j bolt 88 can be positioned and grasp bar 66 of hold down member 22 or 23. The upwardly biasing force of spring 92 will hold j bolt 88 into abutment with bar 66 and serve to lock frame 24 in place. To release frame 24, all that needs to be done is move j bolts 88 down and out of locking position with bar 66, lift vertically the back of frame 24 and then slide rearwardly frame 24 out of van 10.

FIGS. 9 and 10 show an additional optional feature of the present invention. Many times it is desired that some sort of projection against table 26 inadvertently or unintentionally sliding off of frame 24 be incorporated into the design. As shown in FIG. 9, one way to accomplish this would be to bolt a bracket 96 to the front of table 26. Bracket 96 would include a semi-circular channel 98 oriented vertically which would receive a stop pin assembly 100. Stop pin assembly 100 is comprised of a long pin 102 having a transverse perpendicular small pin 104 extending from its side. At the top of long pin 102 is connected a bumper 106 facing rearwardly with respect to table 26.

The bottom of long pin 102 extends below table 26. As can be seen in FIG. 9, semi-circular portion 98 of bracket 96 also has a small notch 108 which would receive the small pin 104 of long pin 102 when inserted into bracket 96. This would hold long pin 102 in place and orientate bumper 106 rearwardly.

A stop 110 would be positioned on frame 24 at any of the cross beams or transverse beams. Stop 110 would include an upwardly extending leg 112 and a bumper 114. As can be easily appreciated, when table 26 is moved on base frame 24, long pin 102 would allow such slidable translation until it abutted against bumper 114 of stop 110. This safety device then would prevent table 26 from completely rolling off frame 24, or from rolling farther than is desired.

To release this automatic safety stop, all that needs to be done is to remove stop pin assembly 100. Stop 110 would then not interfere with the movement of table 26.

As can be seen in FIG. 10, the relative orientation of stop pin assembly 100 with stop 110 is depicted.

FIGS. 11 and 12 show in isolated view wheels 48 for table 26. Another feature which can be optionally be incorporated into the present invention is the ability for wheels 48 to be retracted and held in a retracted position. This is accomplished by using the structure shown in FIGS. 11 and 12. The actual wheels 48 are rotatably mounted on tubes 116. Tubes 116 are in turn slidably movable within sleeves 118 which are welded to the underside of the rear end of table 26. It is to be understood that in the preferred embodiment, rear end 120 of table 26 is angled downwardly (see FIG. 4). This shape is advantageous in that it gives a better entry point for loads which are being pushed onto table 26, and assists in protecting bumpers and other hardware on van 10.

The precise positioning of sleeves 118 relative to table 26 and end 120 can be seen in FIG. 4.

As can also be seen, sleeves 118 have channels 122 in which a pin 124 attached to tube 116 moves. Channels 122 control the orientation of wheels 48 as well as allow tubes 116 to be locked in either the extended position shown in FIG. 11, or the retracted position in FIG. 12. It can be seen that in the retracted position, tube 116 is rotated and pin 124 is locked into place at the top of sleeve 118 by virtue of a notch 126. The rotation of tubes 116 allows them to be better retracted and put out of the way from the end of table 26. A bolt 128 serves as the axle for wheels 48 with respect to tube 116.

FIGS. 13 and 14 show a still further optional feature of the preferred embodiment. It is also desirous many times to be able to lock table 26 in various positions on frame 24. In the present embodiment, this is accomplished by utilizing a retractable pin assembly 130 which is operable by a control member 132 hingeably connected at the rear of table 26.

FIG. 13 shows the bottom view of table 26 when slidably mounted on frame 24. Pin assembly 130 is slidably mounted on blocks 134 and 136 and moves horizontally. A snap ring 138 holds a spring 140 in position shown in FIG. 14. This biases pin 142 to an extended position.

Pin 142 is aligned vertically with one of the longitudinal beams 30 or 32 of base frame 24. At the selected locking positions, apertures 144 are drilled through longitudinal beam 30 or 32. At the rear end of pin 142, a control wire 146 is connected and guided by pulleys 148 and 150 to control member 132. Therefore, by moving hingeably moving control member 132, control wire 146 pulls back on pin 142. Table 26 can then be slid along until the desired position, control member is then released and when the front end 152 of pin 142 enters a desired aperture 144, spring 140 pushes pin 142 through that aperture and locks the table 26 into place with respect to frame 24. Control member 132 is pulled to release pin 142 and table 26 can then be slid to another desired position or removed from frame 24.

Therefore, it can be seen that the invention achieves at least all of its stated objectives. It is to be understood, however, that the included preferred embodiment and optional features are given by way of example only, not by way of limitation to the invention, which is solely described by the claims herein. Variations obvious to one skilled in the art will be included within the invention defined by the claims.

For example, it is to be understood that in the preferred embodiment, most of the base frame 24 elements as well as the supporting frame for table 26 is made out of aluminum. Other materials are possible, including but not limited to steel. Also, to make the surface of table 26 more adaptable to sliding items on and off, in the preferred embodiment, such surfaces made of fiberglass which can be bolted to the framework for table 26.

It is also to be understood that in the preferred embodiment, base frame 24 can be on the order of 40 pounds which is easily liftable and movable by one person. Table 26 is on the order of 75 pounds which with utilization of wheels 48 is also manageable by one person.

Further in the preferred embodiment, roller bearings 28 can simply be similar to roller skate wheels with double bearings inside and synthetic or plastic wheels.

Still further, the present invention is adaptable for all sorts of uses. In the preferred embodiment, the invention can be utilized for loading and unloading caskets, gurneys, carts, and the like. Hardware can be utilized to secure such items in place during transit. Other uses could include appliances, office machines, animal cages, boxed supplies, etc. The present invention allows easy conversion of a vehicle for this loading and carrying purpose. Thereafter, the vehicle can be quickly and easily reconverted to another use, such as personal use, or passenger carrying use.

A further example of the flexibility of the invention can be seen with reference to FIGS. 15 and 17. In the event that built-in hold-down members 20-23 (such as shown in FIG. 1) are not included with the vehicle, or, as is the case in some instances, the vehicle has only a few hold down members or they are not in the right places, alternative hold down assembly 154 can be utilized. A block 156 can be welded or otherwise secured to base frame 24 and extends horizontally therefrom. Block 156 would have an aperture 158 vertically through it as shown in FIGS. 15 and 16.

A handle 160 is perpendicularly connected with a shaft 162 which extends through aperture 158 and block 160. A spring 164 biases handle 160 upwardly.

Instead of utilizing the bar 66 in the cavity 68 of built-in hold down members shown in previous drawings, a customized hold down plate 166 (see FIG. 17) is bolted to floor 14 of the van. As can be seen in FIG. 17, hold down plate 166 comprises a bottom plate 168 (bolted to floor 14) having a circular aperture 170 in its center. A top plate 172 is secured by welding or otherwise over bottom plate 168 and contains an elongated slot 174, the length of the slot being less than the diameter of circular aperture 170.

The bottom end 176 of shaft 162 connected to handle 160 contains a foot 178 which is in generally the same shape as elongated slot 174, but of slightly less diameter so that it can fit through elongated slot 174.

Hold down plates 166 are then positioned on floor 14 of van 10 at the points where frame 24 is desired to be secured. The hold plates 166 are also positioned so that they correspond with the position of foot 178 for each shaft and handle 162, 160. Frame 24 would then be positioned over hold down plates 166. Handle 160 would be turned so that foot 178 would fit within elongated slot 174. Frame 24 would then be lowered so that foot 178 drops into circular aperture 170. Handle 160 would then be turned approximately 90° so that foot 178 is retained below elongated slot 174 and cannot be released. In this manner, only the small hold down plates 166 need to be secured to floor 14. In the preferred embodiment, the height of both top and bottom plates 172 and 166 is a fraction of an inch and therefore hold down plates 166 would not unduly disrupt other uses of the van 10 when frame 24 and table 26 are removed.

What is claimed is:

1. An easy to install and remove slidable carrying table for vehicles comprising:

a unitary table means having a generally planar upper carrying surface;

a unitary base frame means removably securable to a vehicle floor;

a connection means for providing slidable movement of the table means with respect to the base frame means; and wheel means operatively connected to at least one end of the table means to allow rolling transport of the table means, the wheel means being retractable from a first extended position to a second retracted position and comprising a tubular longitudinal member having at one end a transverse axle to the longitudinal axis of the tubular member onto which a rotatable wheel is attached, and having a pin means rigidly connected to the tubular member and extending transversely from the longitudinal axis, a sleeve means mounted to the table means slidably receiving the tubular member and including a slot in its surface, the slot defining stop portions for the first and second positions of the wheel means, the slot allowing locking of the wheel means in the first and second positions and rotation of the tubular member around the longitudinal axis to rotate the wheel to a retracted second position.

2. An easy to install and remove slidable carrying table for vehicles comprising:

a unitary table means having a generally planar upper carrying surface;

a unitary base frame means removably securable to a vehicle floor; and a connection means for providing slidable movement of the table means with respect to the base frame means;

the base frame means including transverse members to a longitudinal axis of the base frame means, the transverse members including bracket means for connection to the vehicle floor, the bracket means including front brackets and rear brackets, the back brackets comprising a piece securable to the table means at an upper portion, and having a lower portion which includes a U-shaped vertical notch which receives a transverse bar of a hold down means, the vertical notch allowing generally vertical insertion of the base frame means onto the rear hold down means in the vehicle floor.

3. The table of claim 2 wherein the back brackets further include locking means for locking the back brackets into the hold down means and thus locking the entire base frame means to the vehicle floor and preventing movement of the base frame means in any direction.

4. The table of claim 3 wherein the locking means includes a movable hook member pivotable with respect to the back bracket from a first position where the hook member is not engaged with the transverse bar of the hold down means, and a second position where the hook member is engaged with the transverse bar of the hold down means.

5. The table of claim 4 wherein the locking means is resiliently biased to bias the hook member against the transverse bar of the hold down means when in the second position.

* * * * *